T. H. ESTES.
TESTING DEVICE FOR JUMP SPARK IGNITION SYSTEMS.
APPLICATION FILED OCT. 28, 1912.
1,084,932.
Patented Jan. 20, 1914.
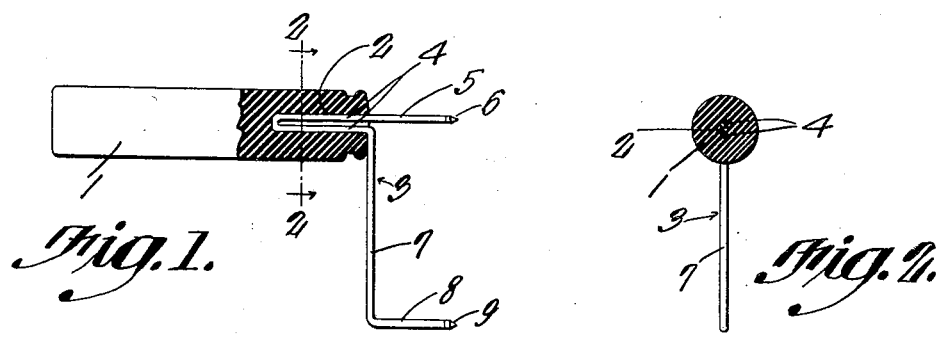
Fig. 1.
Fig. 2.
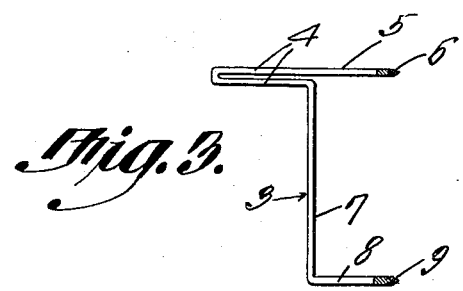
Fig. 3.
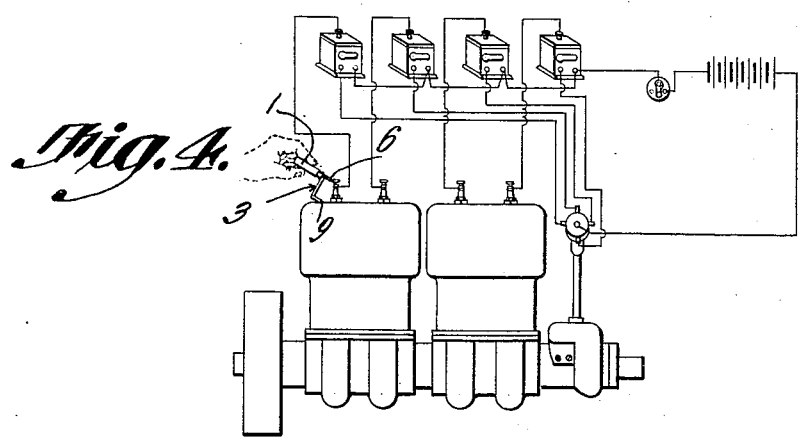
Fig. 4.
Witnesses
Thomas H. Estes, Inventor
by C. A. Snow & Co., Attorneys

UNITED STATES PATENT OFFICE.

THOMAS HENRY ESTES, OF TEXARKANA, TEXAS.

TESTING DEVICE FOR JUMP-SPARK IGNITION SYSTEMS.

1,084,932. Specification of Letters Patent. Patented Jan. 20, 1914.

Application filed October 28, 1912. Serial No. 728,301.

*To all whom it may concern:*

Be it known that I, THOMAS H. ESTES, a citizen of the United States, residing at Texarkana, in the county of Bowie and State of Texas, have invented a new and useful Testing Device for Jump-Spark Ignition Systems, of which the following is a specification.

The present invention relates to improvements in testing devices for jump spark ignition systems, as are especially applied to explosive engines, the primary object of the invention being the provision of a simple device whereby the spark plugs and cylinders of an explosive engine may be properly tested to locate a short circuit or broken conductor, the same being so constructed that such testing operation may be carried on without the necessity of stopping the engine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation partly in section of the complete device. Fig. 2 is a cross section taken on line 2—2 of Fig. 1. Fig. 3 is a detailed view of the metal member carried by the device. Fig. 4 is an electrical diagram showing the use of the present device.

Referring to the drawings, the numeral 1 designates a handle which is made of an insulating material and is provided at one end with the concentrically disposed socket 2 for the reception of the metal detecting member 3. This member 3 is preferably made of copper wire, and is bent upon itself to form the two parallel members 4 for insertion within the socket 2 of the handle, the normal tension of the members to separate retaining the detecting member within the handle so that the same may be readily manipulated, as will presently appear. One straight terminal 5 is employed and extends in a substantially axial line from the handle and is provided upon its outer end with the platinum point 6, while a right angled arm 7 is disposed away from and at substantially right angles to the axial center line of the handle 1 and is provided upon its end with a terminal 8 which is disposed in parallel with the terminal 5 and carries upon its outer end a platinum point 9.

From the foregoing description, taken in connection with the drawings it is evident that with a device of the present construction, that short circuiting or ignition trouble may be located in the ignition circuit, as shown in Fig. 4, by placing either one of the points 6 or 9 in contact with the wire leading to the spark plug while the other contact 9 or 6 is disposed in engagement with the cylinder. It is also evident that this testing operation may be carried on during the running of the engine and that the trouble may be located very quickly.

What is claimed is:

1. In a detecting device of this character, a handle of insulating material having a concentrically disposed socket in one end and a detector member made of a single strand of wire and bent to form a supporting shank for insertion within the socket of the handle and having two parallel and spaced bridging terminals.

2. In a detecting device of this character, having a handle composed of insulating material and provided with a concentric socket in one end thereof, and a metal detecting member made from a single strand of wire and having one straight terminal, a portion of which is insertible within the socket of the handle, and a compound curved terminal a portion of which is parallel and co-extensive with the socket engaging portion of the first terminal and insertible within said socket.

In testimony that I claim the foregoing as my own, I have hereto affixed my signature in the presence of two witnesses.

THOMAS HENRY ESTES.

Witnesses:
 T. S. EDWARDS,
 L. M. BROOKS.

Copies of this patent may be obtained for five cents each, by addressing the "Commissioner of Patents, Washington, D. C."